United States Patent
Ichiman et al.

(10) Patent No.: US 6,329,814 B1
(45) Date of Patent: Dec. 11, 2001

(54) TONE WHEEL AND METHOD OF MAGNETIZING THE SAME AND METHOD OF MANUFACTURING SUCH TONE WHEEL

(75) Inventors: Shinzaburo Ichiman; Hideo Mizuta, both of Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 0 days.

(21) Appl. No.: 09/256,101

(22) Filed: Feb. 24, 1999

(30) Foreign Application Priority Data

Feb. 25, 1998 (JP) .................................................. 10-062193

(51) Int. Cl.⁷ ...................................................... G01B 7/30
(52) U.S. Cl. ................ 324/207.22; 324/207.25; 324/174; 335/284; 29/592.1
(58) Field of Search ........................ 324/207.22, 207.21, 324/207.25, 174; 361/143, 147; 335/284; 29/602.1, 592.1

*Primary Examiner*—Jay Patidar
(74) *Attorney, Agent, or Firm*—Wenderoth, Lind & Ponack, L.L.P.

(57) ABSTRACT

A tone wheel includes a cylindrical elastic multipole magnet formed by a cylindrical elastic inner lining element and a metallic ring in which the cylindrical elastic inner lining element is shaped into a cylindrical form from a composite material including a mixture composed of any suitable elastic material and any suitable powdery ferromagnetic material, and is disposed inside the metallic ring in such a way that its inner circumferential surface is inclined at a predetermined angle of inclination "θ" with regard to the center axis through the cylindrical elastic inner lining element. A magnetizing yoke is further included, wherein the yoke has its outer circumferential wall formed to have the angle of inclination corresponding to the predetermined angle of inclination "θ" of the cylindrical elastic inner lining element, and provides alternating S and N (or N and S) polarity pattern in the circumferential direction of the outer circumferential wall. When the yoke is brought closer to the cylindrical elastic inner lining element until the outer circumferential wall of the yoke can engage the inner circumferential surface of the cylindrical elastic inner lining element, the inner circumferential surface may be magnetized by the yoke, forming a magnetic pole face carrying the alternating N and S (or S and N) polarity pattern that exactly matches the reversed pattern of the alternating S and N (or N and S) polarity pattern of the magnetizing yoke.

6 Claims, 4 Drawing Sheets

TONE WHEEL AND METHOD OF MAGNETIZING THE SAME AND METHOD OF MANUFACTURING SUCH TONE WHEEL

BACKGROUND OF THE INVENTION

FIELD OF THE INVENTION

The present invention relates generally to the field of a rotation detector for detecting the number of revolutions or the speed of rotation, such as a rotation detecting apparatus that is specifically intended for use in detecting the number of revolutions or the speed of rotation for wheels on an automotive vehicle. More particularly, the present invention relates to a tone wheel that may be included in such rotation detecting apparatus together with a rotation sensor for detecting the number of revolutions, wherein the tone wheel is provided for enhancing the sensing ability of the rotation sensor, or the rotation detecting apparatus incorporating the rotation sensor, to detect the number of revolutions or the speed of rotation with higher precision.

Typically, the rotation detecting apparatus of the type described above is mounted on an automobile vehicle so that it can flexibly control the vehicle safety driving mechanism, such as the antilock braking system, the traction control system, the stability control system and the like, which is also installed on the automotive vehicle. Specifically, this rotation detecting apparatus is located on the hub flange and the like in the vehicle's suspension system, and is used for detecting the actual number of revolutions/the speed of rotation for the wheels. When there is any difference in the number of revolutions/the speed of rotation between each of the front wheels and/or between each of the rear wheels that may be determined from the actual number of revolutions/the speed of rotation thus detected, the vehicle driving system or the braking system may be turned on or off, thereby controlling the behavior of the vehicle. This is to ensure that the vehicle can be running with safety in case any emergency situation should occur.

Typically, the rotation detecting apparatus is constructed by incorporating the tone wheel and the rotation sensor therein, as described below in detail. Generally, the tone wheel includes a seal having a flange extending radially and a radial annular ring formed by the flange. The radial annular ring is made of any magnetizable material and magnetized. Within the rotation detecting apparatus, the rotation sensor is located in proximity to the magnetized annular ring of the tone wheel, so that it can detect the number of revolutions/the speed of rotation in response to a pulse from the magnetized annular ring that represents the actual number of revolutions/speed of rotation.

DESCRIPTION OF THE PRIOR ART

A tone wheel that is employed in the conventional rotation detecting apparatus mounted on the automobile for detecting the number of revolutions/the speed of rotation includes the radial annular ring formed by the flange of the seal as described above, and has the following disadvantages:

Firstly, when the tone wheel is mounted within the rotation detecting apparatus, the physical space that remains to be available within the rotation detecting apparatus is very small, and only exists on the lateral sides of the tone wheel. This space must be reserved for the rotation sensor which should be located in proximity to the radial annular ring. However, the space that remains to be available for the rotation sensor is restricted. In fact, the space that can be used for mounting both the tone wheel and the rotation sensor within the rotation detecting apparatus is not large enough, so that it is very difficult to mount the tone wheel and the rotation sensor within the rotation detecting apparatus. Thus, detecting the number of revolutions/speed of rotations by the rotation sensor must be performed in such restricted physical space that exists on the lateral sides of the tone wheel.

Secondly, in the before described tone wheel, the area on which the magnetizing is applied is small and limited. That is to say, the radial annular ring formed on the flange in the seal is magnetized as the before described, and the magnetized radial annular ring has the alternating S and N or N and S polarities by the magnetizing for radiating a pulse to the rotation sensor. In this case, the radial annular ring was formed on the flange, so that the area of the radial annular ring is small and limited. Thereby the area on which the magnetizing is applied is small and limited. This prevents the rotation detecting apparatus or specifically the rotation sensor therein, from detecting the actual number of revolutions/the speed of rotation with the high accuracy or precision is required.

In order to address the particular problems mentioned above, a solution was proposed which allows for the space that is large enough to accommodate both the tone wheel and the rotation sensor within the rotation detecting apparatus. This also allows for the larger area of the tone wheel on which it can be magnetized. The construction shown in FIG. 4 represents one of such tone wheels according to this prior proposed solution.

Referring to FIG. 4, the tone wheel is shaped into a cylindrical form, and comprises a cylindrically shaped ring 2 tightly fitted into the bearing unit 1, and a cylindrically shaped magnetic pole region 3 in intimate contact with the inner circumferential surface of the cylindrically shaped ring 2. The cylindrical magnetic pole region 3 may be magnetized so that it can carry the alternating S and N polarity pattern along the circumferential direction of the inner circumferential surface. A cylindrical tone wheel comprising a cylindrical ring 2 and a cylindrical multipole magnetic region 3 is thus provided.

As the tone wheel is shaped like the cylindrical form as described above and shown in FIG. 4, it may provide the larger area on which the tone wheel can be magnetized, and may also provide the large free space in the diametrical direction of the tone wheel (on the inner side of the inner circumferential surface of the cylindrical magnetic pole region 3), namely, not on the lateral sides of the tone wheel, where the rotation sensor can be disposed The rotation detecting apparatus is thus completed.

As the method of magnetizing the cylindrical magnetic pole region 3 of the tone wheel shown in FIG. 4, the following method was proposed. According to this method, as shown in FIG. 4, a column-like magnetizing yoke 4 that produces the alternating S and N polarities along the circumferential direction of the outer circumferential wall is inserted into the inner circumferential side of the cylindrical magnetic pole region 3 as shown by an arrow 9, and the outer circumferential wall of the column-like magnetizing yoke 4 and the corresponding inner circumferential side of the cylindrical magnetic pole region 3 are brought closer to each other so that the entire inner circumferential side of the cylindrical magnetic pole region 3 can be magnetized in the alternating N and S polarity pattern at the same time.

It should be noted, however, that when the entire inner circumferential side of the cylindrical magnetic pole region 3 of the tone wheel is to be magnetized at the same time as the before described and shown in FIG. 4, it is more likely that the inner circumferential side of the cylindrical magnetic pole region 3 might be magnetized in the irregular alternating N and S polarity pattern if the gap between the inner circumferential side of the cylindrical magnetic pole region 3 and the outer circumferential wall of the column-like magnetizing yoke 4 is not uniform along the outer circumferential wall of the yoke 4.

The column-like magnetizing yoke 4 is usually formed into a smaller diameter in order to facilitate the insertion of the yoke 4 into the inner circumferential side of the cylindrical magnetic pole region 3, as shown by an arrow 9 (FIG. 4). For this reason, it is more likely that the column-like magnetizing yoke 4 might deviate from the center when it is inserted into the space inside the inner circumferential side of the cylindrical magnetic pole region 3, which would cause the gap between the inner circumferential side of the cylindrical magnetic pole region 3 and the outer circumferential wall of the column-like magnetizing yoke 4 to be irregular or non-uniform along the outer circumferential wall of the yoke 4. If the entire inner circumferential side of the cylindrical magnetic pole region 3 is then to be magnetized in this state, the inner circumferential side of the cylindrical magnetic pole region 3 might be magnetized in the irregular, alternating N and S polarity pattern. This might occur even when the column-like magnetizing yoke 4 has the alternating S and N poles at the regular intervals on its outer circumferential wall, if the gap between the inner circumferential side of the cylindrical magnetic pole region 3 and the outer circumferential wall of the column-like magnetizing yoke 4 is not uniform or is irregular along the outer circumferential wall of the yoke 4, as a result, the cylindrical magnetic pole region 3 would be magnetized irregularly thereby carrying the alternating N and S polarities at irregular intervals when magnetized.

If the inner circumferential side of the cylindrical magnetic pole region 3 has been magnetized so irregularly as to carry the alternate N and S polarities at the irregular intervals, this would cause the rotation sensor to fail to detect the number of revolutions accurately. This is the problem that should be avoided.

It may be understood from the preceding description that the conventional cylindrical tone wheel as well as the conventional method of magnetizing such cylindrical tone wheel provides no effective means to avoid the above problem. Therefore, there are demands for the cylindrically shaped tone wheel that permit the cylindrical multipole magnetic region of the tone wheel to carry the alternating N and S (or S and N) polarities along the circumferential direction of the magnetic pole region, in the pattern that exactly matches the pattern of the alternating S and N (or N and S) polarities of the magnetizing yoke that magnetizes the magnetic pole region, so that it can provide the alternating N and S polarities correctly in that pattern.

SUMMARY OF THE INVENTION

The present invention is proposed to eliminate the problems associated with the conventional tone wheel and the conventional method of magnetizing such tone wheel, as described in the preceding section.

It is therefore one object of the present invention to provide a tone wheel that is designed to allow the magnetizable part, or the magnetic pole region, of the tone wheel to be magnetized over a larger area, to allow for the larger space within the rotation detecting apparatus that is available for both the tone wheel and the rotation sensor to be mounted, and to ensure that the magnetic pole region of the tone wheel can carry alternating N and S (or S and N) polarities in a pattern that exactly matches the pattern of the alternating S and N (or N and S) polarities of the magnetizing yoke, so that the rotation detecting apparatus can detect the actual number of revolutions accurately and with high precision.

Another object of the present invention is to provide a method of magnetizing such tone wheel and a method of manufacturing the same.

In order to achieve the above objects, the tone wheel according to the present invention includes a metallic ring and a cylindrically shaped, elastic inner lining element (hereinafter called "elastic inner lining element") or a cylindrically shaped, elastic outer lining element (hereinafter called "elastic outer lining element"), either of which is made of a composite material containing a mixture composed of any suitable elastic material and any suitable powdery ferromagnetic material and having its inner circumferential surface or its outer circumferential surface formed like a taper having a predetermined angle of inclination with regard to the center axis through the cylindrical elastic inner lining element or the cylindrical elastic outer lining element, wherein the cylindrical elastic inner lining element or the cylindrical elastic outer lining element may be disposed inside or outside the metallic ring, respectively. A magnetizing yoke is used for magnetizing and manufacturing the before described tone wheel so that the tone wheel can carry the particular magnetic pole pattern according to the magnetic pole pattern provided on the magnetizing yoke. The magnetizing yoke has its outer circumferential wall or inner circumferential wall formed like a taper having an angle of inclination corresponding to a predetermined angle of inclination of the inner circumferential surface of the cylindrical elastic inner lining element or the outer circumferential surface of the cylindrical elastic outer lining element, wherein the magnetizing yoke provides the alternating S and N polarities, for example, along the circumferential direction of the outer circumferential wall or inner circumferential wall, for magnetizing the inner circumferential surface of the cylindrical elastic inner lining element or the outer circumferential surface of the cylindrical elastic outer lining element so that they can carry the alternating N and S polarity pattern, for example. More specifically, the inner circumferential surface of the cylindrical elastic inner lining element or the outer circumferential surface of the cylindrical elastic outer lining element may be magnetized by bringing the outer circumferential wall of the magnetizing yoke and the inner circumferential surface of the cylindrical elastic inner lining element with each other by contacting both under pressure, or by bringing the inner circumferential wall of the magnetizing yoke and the outer circumferential surface of the cylindrical elastic outer lining element with each other by contacting both under pressure, so that it provides a magnetic pole face carrying a pattern of alternating N and S (or S and N) polarities that exactly matches the pattern of the alternating S and N (or N and S) polarities of the magnetizing yoke.

A particular embodiment of the present invention is described by referring to the accompanying drawings. With reference to FIG. 1, in the presently described embodiment, a tone wheel includes a bearing unit 1 which serves as a housing, a metallic ring 6 tightly fitted into the inner diametrical side or outer diametrical side of the bearing unit 1 and securely supported by the same, and a cylindrical elastic multipole magnet 7 disposed inside or outside the metallic ring 6 and having a magnetic pole face 71 adapted to carry the alternating N and S polarity pattern, for example, along the circumferential direction of the inner circumferential surface or outer circumferential surface thereof. In this embodiment, the cylindrical elastic multipole magnet 7 may be made of a composite material including a mixture composed of any suitable elastic material and any suitable powdery ferromagnetic material, and the magnetic pole face 71 of the cylindrical elastic multipole magnet 7 may be formed such that it has a predetermined angle of inclination with regard to the center axis through the cylindrical elastic multipole magnet 7.

By forming the cylindrical elastic multipole magnet 7 from the composite material including the mixture composed of the elastic material and the powdery ferromagnetic material as described above, it becomes easier to shape the cylindrical elastic multipole magnet 7 into many different forms. It also becomes easier to dispose the cylindrical elastic multipole magnet 7 inside or outside the metallic ring 6 by means of bonding or the like.

Because the cylindrical elastic inner lining element or the cylindrical elastic outer lining element that will become the cylindrical elastic multipole magnet 7 when magnetized may also be formed from the composite material including the mixture composed of the elastic material and the powdery ferromagnetic material, the cylindrical elastic inner lining element or the cylindrical elastic outer lining element can become deformed elastically when the inner or outer circumferential surface of the elastic inner or outer lining element is to be magnetized into the cylindrical elastic multipole magnet 7 by using the magnetizing method to be described later. Thus, the outer circumferential wall or inner circumferential wall of the magnetizing yoke 8 and the corresponding inner or outer circumferential surface of the cylindrical elastic inner or outer lining element can contact each other closely and uniformly along the entire inner or outer circumferential surface of the cylindrical elastic inner or outer lining element so that the inner or outer circumferential surface of the cylindrical elastic inner or outer lining element can carry alternating N and S (or S and N) polarities in such a pattern that exactly matches the magnetic pole pattern of the magnetizing yoke 8 that provides the alternating S and N (or N an S) polarities.

By forming the magnetic pole face 71 of the cylindrical elastic multipole magnet 7 such that it can have a predetermined angle of inclination with regard to the center axis through the cylindrical elastic multipole magnet 7, the area of the tone wheel to be magnetized can be much larger, as compared with the prior art cylindrical tone wheel. This means that for the rotation detecting apparatus including the tone wheel of the present invention and the rotation sensor 5, the rotation sensor 5 can have broader sensing coverage. Because the rotation sensor 5 can be made to cover the broader sensing range, as described above, by using the tone wheel of the present invention, the rotation detecting apparatus that is constructed by incorporating the tone wheel of the present invention and such rotation sensor will provide the capability of detecting the number of revolutions/the speed of rotations with higher precision.

Because the tone wheel of the present invention is designed to provide a larger open space in its diametrical direction, rather than on its lateral sides, in order to allow the rotation sensor to be located in that open space, the rotation detecting apparatus may be designed more freely and more flexibly, and the tone wheel as well as the rotation sensor can be placed with greater efficiency.

The magnetizing yoke 8 may be used for magnetizing the magnetic pole face 71 because: (1) the magnetic pole face 71 of the cylindrical elastic multipole magnet 7 to be magnetized may be formed so that it has the particular angle of inclination with regard to the center axis through the cylindrical elastic multipole magnet 7; (2) the magnetizing yoke 8 may have its outer or inner circumferential wall formed to have the angle of inclination that matches the angle of the inclination of the magnetic pole face 71; and (3) the magnetizing yoke 8 produces the alternating S and N polarities along the circumferential direction, for example, of the outer or inner circumferential wall. This magnetization may be performed by moving the magnetizing yoke 8 toward the cylindrical elastic inner or outer lining element (which will eventually become the cylindrical elastic multipole magnet 7 when magnetized) along its center axial direction, until it can tightly contact the inclined face of the magnetic pole face 71 being magnetized. In this way, the magnetic pole face 71 may be magnetized so that it can carry alternating N and S polarities in the pattern that exactly matches the magnetic pole pattern of the magnetizing yoke 8 that produces the alternating S and N polarities.

When it incorporates the tone wheel of the present invention thus to be magnetized in such a magnetic pole pattern that exactly matches the magnetic pole pattern of the magnetizing yoke 8, which is provided correctly and with high precision, as well as the rotation sensor, the rotation detecting apparatus is expected to provide the capability of detecting the number of revolutions/the speed of rotations with the higher precision.

DETAILS OF THE PREFERRED EMBODIMENTS

Several preferred embodiments of the present invention are now described by referring to the accompanying drawings.

Figure 1:
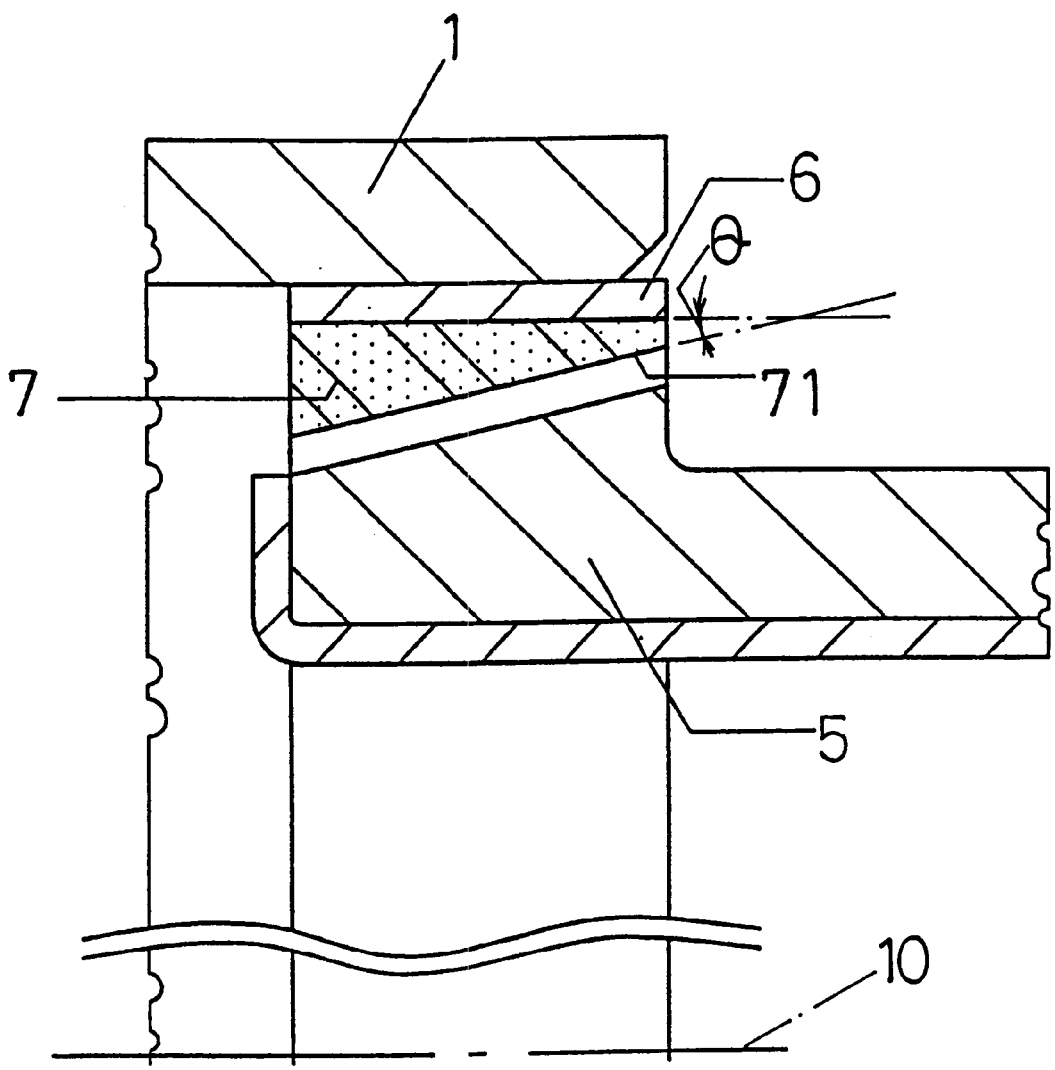
FIG. 1 is an enlarged sectional view illustrating one preferred embodiment of the tone wheel according to the present invention, with some parts omitted.

Referring to FIG. 1, the tone wheel according to the present invention includes a metallic ring 6 and a cylindrical elastic multipole magnet 7 mounted inside the metallic ring 6.

The cylindrical elastic multipole magnet 7 may be made of a composite material including a mixture composed of any suitable elastic material such as synthetic rubber, synthetic resin and the like and a powdery ferromagnetic material such as ferrite, having the size of about one (1) to five (5) micrometers. The cylindrical elastic multipole magnet 7 has a magnetic pole face 71 that may carry an alternating S and N (or N and S) polarity pattern along the circumferential direction of its inner circumferential surface by a magnetizing process described later. The cylindrical elastic multipole magnet 7 has a magnetic pole face 71 inclined at a predetermined angle of inclination with regard to the center axis 10 through the cylindrical elastic multipole magnet 7 (FIG. 1). More specifically, the cylindrical elastic multipole magnet 7 is tapered, having a diameter that is larger on the entry side of the tone wheel on which a rotation sensor 5 is to be inserted and becomes smaller toward the rear of the tone wheel, as shown in FIG. 1.

Preferably and desirably, the angle of inclination for the magnetic pole face 71, as represented by the symbol "θ" in FIG. 1, is relatively shallow with regard to a center axis 10 through the cylindrical elastic multipole magnet 7, such as in the range of between 0.5 degrees and 15 degrees, for example.

The angle of inclination within this range is preferred when the cylindrical elastic multipole magnet 7 is formed. This range is also preferred when the magnetizing process to be described later occurs, because the magnetizing yoke used during the magnetizing process has an outer or inner circumferential wall so formed to be inclined at the above angle range that the magnetization can be performed accurately. Furthermore, when the rotation sensor 5 is located to face the magnetic pole face 71 inclined as above (FIG. 1), the rotation sensor 5 can have a broader sensing coverage of the magnetic pole face by choosing any of the above angles of inclination.

The rotation detecting apparatus may be constructed by incorporating the tone wheel of the present invention as well as the rotation sensor 5 therein, in the manner shown in FIG. 1. The metallic ring 6 forming the tone wheel of the present invention is first pushed into the housing, in this case the bearing unit 1. The metallic ring 6 is then secured by the bearing unit 1 that supports it. Then, the rotation sensor 5 is placed in the hollow portion inside the cylindrical elastic multipole magnet 7 so that it can face the magnetic pole face 71.

Figure 3:
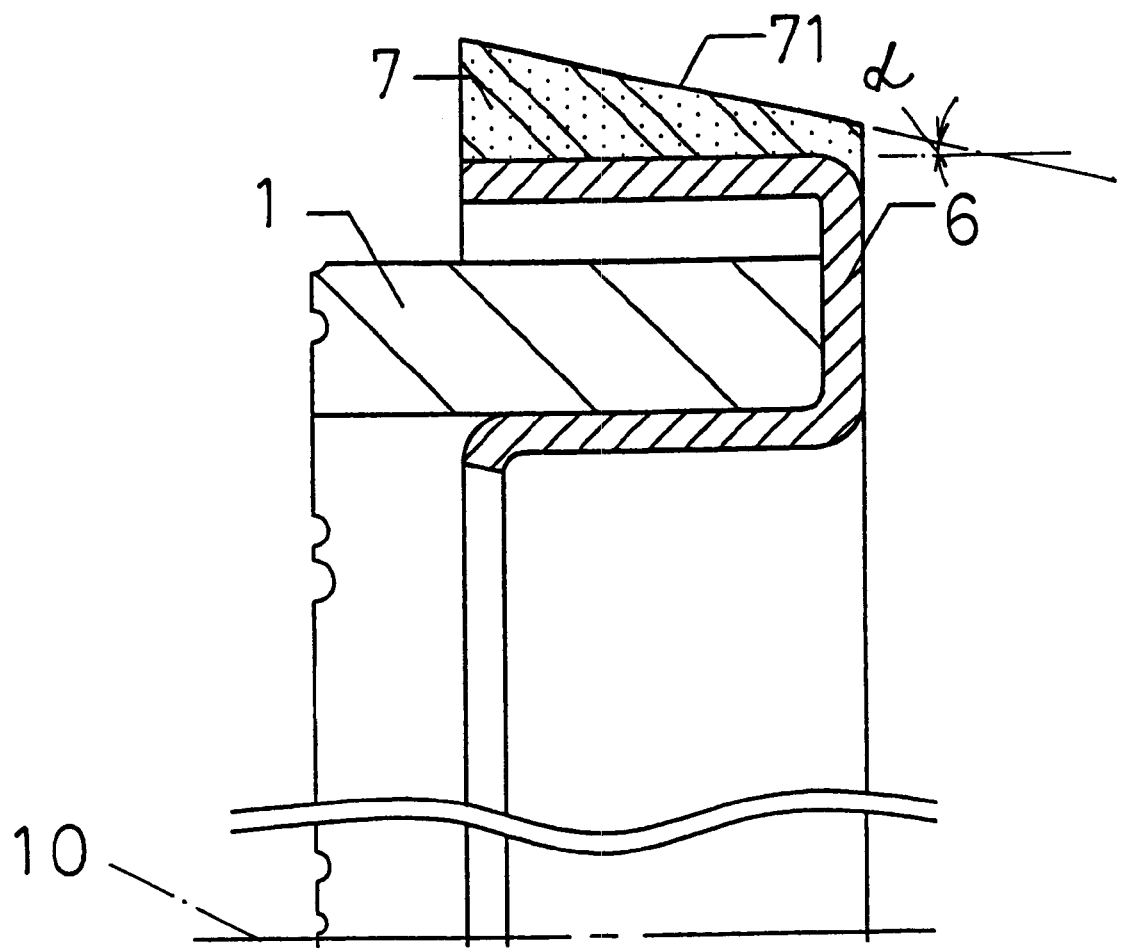
FIG. 3 is an enlarged sectional view illustrating another preferred embodiment of the tone wheel according to the present invention, with some parts omitted.
Figure 4:
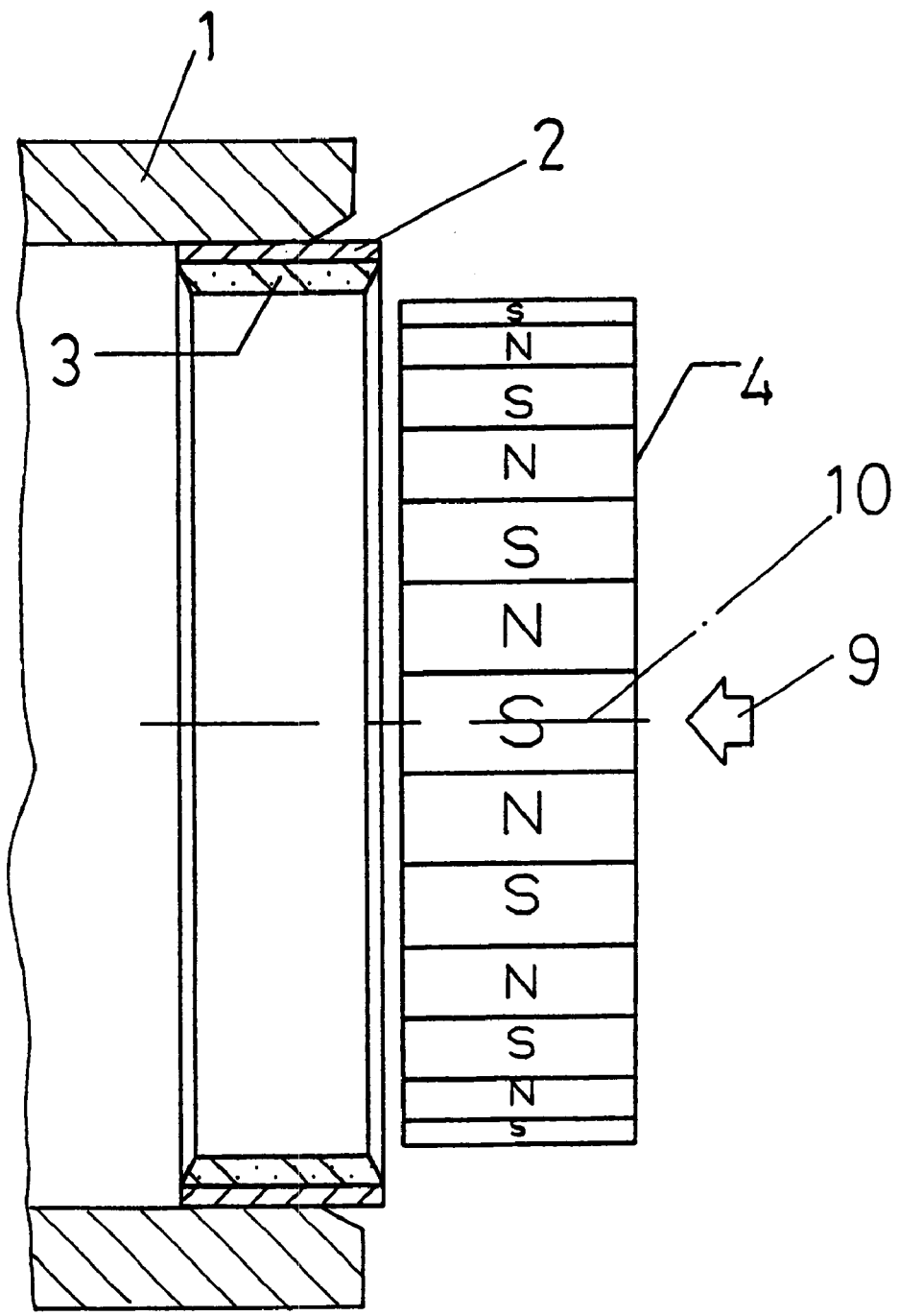
FIG. 4 is a sectional view illustrating the tone wheel and the process of magnetizing it according to the prior art.

As an alternative embodiment, as shown in FIG. 3, the tone wheel may include a cylindrical elastic multipole magnet 7 that may be disposed outside the metallic ring 6. Then, this metallic ring 6 of such tone wheel may be pushed into the housing or bearing unit 1, and may be secured by the bearing unit 1 which supports it so that the magnetic pole face 71 can be located outside the metallic ring 6. In this case, the rotation sensor 5 may be located so that it can face the magnetic pole face 71 from the outside (not shown). In this case, the angle of inclination of the magnetic pole face 71 with regard to the center axis 10 through the cylindrical elastic multipole magnet 7, as denoted by the symbol "α" in FIG. 3, may also be in the range between 0.5 degrees and 15 degrees.

In the embodiments shown in FIGS. 1 and 3, it has been described that the magnetic pole face 71 of the cylindrical elastic multipole magnet 7 may be formed so that it has the angle of inclination "θ" (FIG. 1) or "α" (FIG. 3) in the range of 0.5 and 15 degrees with regard to the center axis 10 through the cylindrical elastic multipole magnet 7. It should be understood, however, that when it is said that the magnetic pole face 71 has the particular angle of inclination "θ" (FIG. 1) or "α" (FIG. 3) with regard to the center axis 10 through the cylindrical elastic multipole magnet 7, it means the same as saying that the magnetic pole face 71 has the particular angle of inclination "θ" (FIG. 1) or "α" (FIG. 3) with regard to the center axis 10 through the bearing unit 1 or the center axis through the metallic ring 6, because the center axis 10 through the cylindrical elastic multipole magnet 7 is parallel with the center axis through the bearing unit 1 (housing) or the center axis through the metallic ring 6.

Next, the method of manufacturing the tone wheel of the invention and the method of magnetizing such tone wheel are described. The manufacturing process is first described.

The cylindrical elastic inner lining element that forms part of the tone wheel may be made of a composite material including a mixture consisting of any suitable elastic material and any suitable powdery ferromagnetic material. This inner lining element may be formed so that its inner circumferential surface can have the particular angle of inclination "θ" (FIG. 1) with regard to the center axis through the inner lining element. Then, the cylindrical elastic inner lining element thus formed may be disposed inside the metallic ring 6 that forms part of the tone wheel. The inner lining element may be secured inside the metallic ring 6 by bonding or the like, for example.

Figure 2:
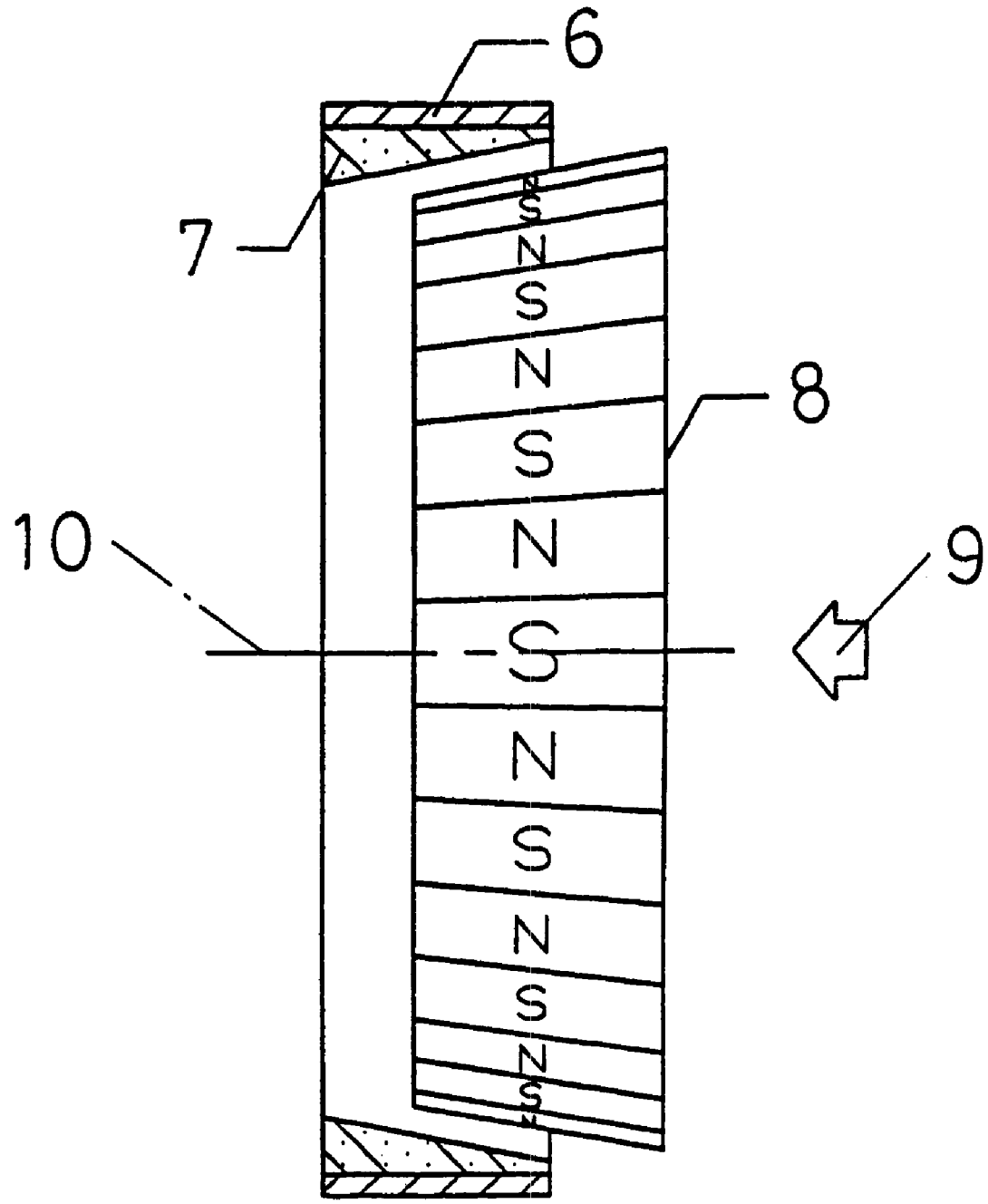
FIG. 2 is a sectional view illustrating the process of magnetizing the tone wheel according to the present invention, with some parts omitted.

The following is the process of magnetizing the inner circumferential surface by using a magnetizing yoke 8 (FIG. 2). The magnetizing yoke 8 may be formed so that its outer circumferential wall can have a taper form having an angle of inclination corresponding to the particular angle of inclination "θ" for the inner circumferential surface of the cylindrical elastic inner lining element. The yoke 8 may provide the alternating S and N polarities, for example, along the circumferential direction of the outer circumferential wall. As shown in FIG. 2, this magnetization may occur by moving the yoke 8 toward the inner lining element along its center axis 10, as shown by arrow 9, until the outer circumferential wall of the yoke 8 engages the inner circumferential surface of the inner lining element tightly. The tone wheel is thus magnetized.

The composite material used for forming the cylindrical elastic inner lining element may contain a mixture composed of an elastic material base such as synthetic resins and a powdery ferromagnetic material, such as ferrite, having a size of 1 to 5 micrometers. Thus, the inner lining element may become deformed elastically when pressed against the outer circumferential wall of the magnetizing yoke 8, so that it can contact the outer circumferential wall of the magnetizing yoke 8 closely and uniformly along its entire circumferential surface. Specifically, the outer circumferential wall of the magnetizing yoke 8 has an inclined surface that matches the corresponding inclined, inner circumferential surface of the cylindrical elastic inner lining element, and the inner lining element may become deformed elastically when pressed by the magnetizing yoke 8. Thus, the outer circumferential wall of the magnetizing yoke 8 can engage the inner circumferential surface of the inner lining element tightly and closely, without deviating from the center within the inside hollow portion of the inner lining element. In this way, the inner circumferential surface of the cylindrical elastic inner lining element can be magnetized by the magnetizing yoke 8 that provides the alternating S and N polarities in this case, so that it can carry the alternating N and S polarities in the pattern that exactly matches the pattern of the magnetizing yoke 8. This can occur with a high precision. For example, if the outer circumferential wall of the magnetizing yoke 8 carries the alternating S and N polarity pattern in its circumferential direction, and S and N polarities are produced alternately at regular intervals in that pattern, the inner circumferential surface of the cylindrical elastic inner lining element will be magnetized so that it can also carry the alternating N and S polarity pattern in its circumferential direction as well as at the same regular intervals.

This magnetizing process can be performed easily by moving the magnetizing yoke 8 in the direction of arrow 9 in FIG. 2 and engaging the outer circumferential surface of the magnetizing yoke 8 with the inner circumferential surface of the cylindrical elastic inner lining element.

Through the magnetizing process, the cylindrical elastic inner lining element becomes the cylindrical elastic multipole magnet 7 having the magnetic pole face 71 from which the alternating N and S polarities may be generated along the circumferential direction of the inner circumferential surface. Finally, the tone wheel of the invention is thus completed, which includes the metallic ring 6 and the cylindrical elastic multipole magnet 7 disposed inside the metallic ring 6.

It should be noted that the method of manufacturing the tone wheel and the method of magnetizing such tone wheel, which have been described by referring to FIG. 2, are applied for the manufacture of the tone wheel including the metallic ring 6 and the cylindrical elastic multipole magnet 7 disposed inside the metallic ring 6 and for the magnetization of the magnetic pole face 71 in such tone wheel, respectively, as shown in FIG. 1.

FIG. 3 illustrates a variation of the construction of the tone wheel described so far, wherein the tone wheel includes the metallic ring 6 and the cylindrical elastic multipole magnet 7 which in this case is disposed outside the metallic ring 6. The cylindrical elastic outer lining element that is used in this variation may be formed in the same manner as for the cylindrical elastic inner lining element, and has its outer circumferential surface inclined at a predetermined angle "α" (FIG. 3) with regard to the center axis through the cylindrical elastic outer lining element which is disposed outside the metallic ring 6. A magnetizing yoke, which is used in this variation but not shown, has its inner circumferential wall inclined at the angle corresponding to the predetermined angle of inclination "α" of the outer circumferential surface of the cylindrical elastic outer lining element, and produces the alternating S and N (or N and S) polarities along the circumferential direction of the inner circumferential wall. The magnetizing yoke may be pressed against the cylindrical elastic outer lining element so that former's inner circumferential wall can engage the latter's outer circumferential surface. Thus, the outer circumferential surface of the cylindrical elastic outer lining element may be magnetized so that it can carry the pattern of the alternating N and S (or S and N) polarities.

It is noted that there are two possible ways for completing the tone wheel of the present invention. The first way is to first magnetize the tone wheel and to then mount it inside the housing, or specifically the bearing unit 1, as described so far. The second way is to first mount the cylindrical elastic inner lining element inside the metallic ring 6 or the cylindrical elastic outer lining element outside the metallic ring 6, to then press the assembly into the housing, or specifically, the bearing unit 1, and to finally magnetize it in the manner as described above.

Although the present invention has been described with reference to the particular preferred embodiments thereof it should be understood that various changes and modifications might be made without departing from the spirit and scope of the invention as defined in the appended claims.

What is claimed is:

1. A tone wheel including a metallic ring and a cylindrical elastic magnet disposed inside or outside the metallic ring, the cylindrical elastic magnet being an elastic multipole magnet shaped into a cylindrical form from a composite material containing a mixture composed of an elastic material and a powdery ferromagnetic material and having an inner or outer circumferential surface for providing a magnetic pole face which is magnetized to carry alternating N and S (or S and N) polarities along the circumferential direction, wherein the magnetic pole face of the cylindrical elastic multipole magnet is formed such that it has a predetermined angle of inclination with regard to the center axis through the cylindrical elastic multipole magnet.

2. The tone wheel as defined in claim 1, wherein the magnetic pole face of the cylindrical elastic multipole magnet is provided such that it has an angle of inclination of 0.5 through 15 degrees with regard to the center axis of the cylindrical elastic multipole magnet.

3. A method of magnetizing a tone wheel including a cylindrical elastic inner lining element and a metallic ring, the cylindrical elastic inner lining element being shaped into a cylindrical form from a composite material containing a mixture composed of an elastic material and a powdery ferromagnetic material and having its inner circumferential surface formed such that it has a predetermined angle of inclination with regard to the center axis through the cylindrical elastic inner lining element, the method comprising:

disposing the cylindrical elastic inner lining element inside the metallic ring;

providing a magnetizing yoke having an outer circumferential wall formed to have an angle of inclination corresponding to the predetermined angle of inclination for the inner circumferential surface of the cylindrical elastic inner lining element, wherein the magnetizing yoke provides alternating S and N (or N and S) polarities along the circumferential direction of the outer circumferential wall; and bringing the outer circumferential wall of the magnetizing yoke and the inner circumferential surface of the cylindrical elastic inner lining element into close contact with each other under pressure, whereby the inner circumferential surface of the cylindrical elastic inner lining element is magnetized by the yoke to carry the alternating N and S (or S and N) polarities along the circumferential direction of the inner circumferential surface.

4. A method of magnetizing a tone wheel including a cylindrical elastic outer lining element and a metallic ring, the cylindrical elastic outer lining element being shaped into a cylindrical form from a composite material containing a mixture composed of an elastic material and a powdery ferromagnetic material and having its outer circumferential surface formed such that it has a predetermined angle of inclination with regard to the center axis through the cylindrical elastic outer lining element, the method comprising:

disposing the cylindrical elastic outer lining element outside the metallic ring;

providing a magnetizing yoke having an inner circumferential wall formed to have an angle of inclination corresponding to the predetermined angle of inclination for the outer circumferential surface of the cylindrical elastic outer lining element, wherein the magnetizing yoke provides alternating S and N (or N and S) polarities along the circumferential direction of the inner circumferential wall; and bringing the inner circumferential wall of the magnetizing yoke and the outer circumferential surface of the cylindrical elastic outer lining element into close contact with each other under pressure, whereby the outer circumferential surface of the cylindrical elastic outer lining element is magnetized by the yoke to carry the alternating N and S (or S and N) polarities along the circumferential direction of the outer circumferential surface.

5. A method of manufacturing a tone wheel including a cylindrical elastic inner lining element and a metallic ring, the cylindrical elastic inner lining element being shaped into a cylindrical form from a composite material containing a mixture composed of an elastic material and a powdery ferromagnetic material and having its inner circumferential surface formed such that it has a predetermined angle of inclination with regard to the center axis through the cylindrical elastic inner lining element, the method comprising:

disposing the cylindrical elastic inner lining element inside the metallic ring;

providing a magnetizing yoke having an outer circumferential wall formed to have an angle of inclination corresponding to the predetermined angle of inclination for the inner circumferential surface of the cylindrical elastic inner lining element, wherein the magnetizing yoke provides alternating S and N (or N and S) polarities along the circumferential direction of the outer circumferential wall; and bringing the outer circumferential wall of the magnetizing yoke into close contact with the inner circumferential surface of the cylindrical elastic inner lining element under pressure, whereby the inner circumferential surface of the cylindrical elastic inner lining element is magnetized by the yoke to carry the alternating N and S (or S and N) polarities along the circumferential direction of the inner circumferential surface.

6. A method of manufacturing a tone wheel including a cylindrical elastic outer lining element and a metallic ring, the cylindrical elastic outer lining element being shaped into a cylindrical form from a composite material containing a mixture composed of an elastic material and a powdery ferromagnetic material and having its outer circumferential surface formed such that it has a predetermined angle of inclination with regard to the center axis through the cylindrical elastic outer lining element, the method comprising:

disposing the cylindrical elastic outer lining element outside the metallic ring;

providing a magnetizing yoke having an inner circumferential wall formed to have an angle of inclination corresponding to the predetermined angle of inclination for the outer circumferential surface of the cylindrical elastic outer lining element, wherein the magnetizing yoke provides alternating S and N (or N and S) polarities along the circumferential direction of the inner circumferential wall; and bringing the inner circumferential wall of the magnetizing yoke into close contact with the outer circumferential surface of the cylindrical elastic outer lining element under pressure, whereby the outer circumferential surface of the cylindrical elastic outer lining element is magnetized by the yoke to carry the alternating N and S (or S and N) polarities along the circumferential direction of the outer circumferential surface.

\* \* \* \* \*